US008351605B2

(12) United States Patent
Bandholz et al.

(10) Patent No.: US 8,351,605 B2
(45) Date of Patent: Jan. 8, 2013

(54) STEALTH MESSAGE TRANSMISSION IN A NETWORK

(75) Inventors: Justin Bandholz, Cary, NC (US);
William G. Pagan, Durham, NC (US);
William Piazza, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 12/560,665

(22) Filed: Sep. 16, 2009

(65) Prior Publication Data

US 2011/0066910 A1    Mar. 17, 2011

(51) Int. Cl.
*H04K 1/00* (2006.01)
(52) U.S. Cl. ........... 380/255; 380/42; 714/703; 714/807
(58) Field of Classification Search .................. None
See application file for complete search history.

(56) References Cited

U.S. PATENT DOCUMENTS

| | | | |
|---|---|---|---|
| 5,150,368 A * | 9/1992 | Autruong et al. | 714/747 |
| 6,480,096 B1 | 11/2002 | Gutman et al. | |
| 7,289,961 B2 * | 10/2007 | Bocko et al. | 704/273 |
| 7,337,213 B2 | 2/2008 | Gusler et al. | |
| 7,475,119 B2 | 1/2009 | Gusler et al. | |
| 7,609,697 B2 * | 10/2009 | Nishida et al. | 370/394 |
| 7,929,409 B2 * | 4/2011 | Chitrapu et al. | 370/208 |
| 8,001,432 B2 * | 8/2011 | Orbach et al. | 714/720 |
| 2005/0228659 A1 | 10/2005 | Mitlin | |
| 2007/0140259 A1 | 6/2007 | Mouffron et al. | |
| 2007/0223389 A1 | 9/2007 | Basso et al. | |

OTHER PUBLICATIONS

Mazurczyk et al. "Hiding Information in Retransmissions". v3, May 14, 2009. http://arxiv.org/abs/0905.0363.*
Spence, David. "A Review of Chaffing and Winnowing". SANS Institute InfoSec Reading Room, 2003. http://www.sans.org/reading_room/whitepapers/vpns/review-chaffing-winnowing_876.*
K. Szczypiorski, HICCUPS: Hidden Communication System for Corrupted Networks, In Proc. of: The Tenth International Multi-Conference on Advanced Computer Systems ACS'2003.*
Moskowitz et al. "A New Paradigm Hidden in Steganography". Dec. 2001.*
Information Sciences Institute, University of Southern California. "Transmission Control Protocol". Sep. 1981.*
Rowland, Craig H. "Covert Channels in the TCP/IP Protocol Suite". First Monday, vol. 2. May 1997.*
Mazurczyk, W et al. "Steganography of VoIP Streams". Warsaw University of Technology, Faculty of Electronics and Information Technology, Institute of Telecommunications. May 2008.*
The TCP/IP Guide. "TCP high network latency retransmission". Sep. 2005.*

(Continued)

*Primary Examiner* — Steve Nguyen
(74) *Attorney, Agent, or Firm* — Thomas Tyson; Jeffrey L. Streets

(57) ABSTRACT

Embodiments of the invention include methods of transmitting a hidden message within a secured primary data transmission. In one embodiment, a method involves transmitting a primary data transmission over a computer network from a source host to a receiving host. Intentionally-corrupted packets are introduced within the primary data transmission in a manner providing a hidden message. For example, a pattern of intentionally-corrupted packets may be used to encode the hidden message. Alternatively, the hidden message may be embedded within the data area of the intentionally-corrupted packets. The intentionally-corrupted packets are received and interpreted at the receiving host to determine the hidden message.

14 Claims, 3 Drawing Sheets

OTHER PUBLICATIONS

Sivathanu, Gopalan et al "Ensuring Data integrity in Storage:Techniques and Applications" Stony Brook University Computer Science Department, Stony Brook, NY, Nov. 11, 2005, pp. 26-36.

Awad, Neveen Farag et al "The Deceptive Behaviors that Offend Us Most About Spyware" Communications of the ACM, Aug. 2005, vol. 48, No. 8, pp. 55-60.

Gorinsky, Sergey "Design of Multicast Protocols Robust Against Inflated Subscription", ACM Transactions on Networking, Apr. 2006, vol. 14, No. 2, pp. 249-262.

Moskowitz, et al. "A new paradigm hidden in steganography". NSPW '00 Proceedings of the 2000 workshop on New security paradigms, pp. 41-50. Dec. 2001.

Krzysztof, Szczypiorski. "HICCUPS: Hidden communication system for corrupted networks". Warsaw University of Technology, Institute of Telecommunications ul. Nowowiejska 15/19, 00-665 Warsaw, Poland, 2003.

TCP high network latency retransmission. The TCP/IP Guide. 2005.

Wojciech et al. "Steganograpy of VoIP Streams". Warsaw University of Technology, Faculty of Electronics and Information Technology, Institute of Telecommunications, May 2008.

Rowland, Craig. "Covert Channels in the TCP/IP Protocol Suite". First Monday, vol. 2, May 1997.

"Transmission Control Protocol". Information Sciences Institute, University of Southern California, Darpa Internet Program Protocol Specification, Sep. 1981.

* cited by examiner

US 8,351,605 B2

STEALTH MESSAGE TRANSMISSION IN A NETWORK

BACKGROUND

1. Field of the Invention

The present invention relates to secure message transmission in a data network.

2. Background of the Related Art

Electronic data may be transmitted between computers over a network, such as a local area network (LAN), a wireless communications network, and the Internet. Examples of electronic data include raw data used by a computer internally, and also data structured as electronic files available to a user, such as e-mail, documents, and multimedia content. A LAN is a computer network covering a small physical area, such as a home or office, or a group of buildings in close geographical proximity, such as a school or an airport. A wireless network is a computer network having wirelessly-connected nodes. The Internet is a standardized, global system of interconnected computer networks that provides communication between millions of computers. A network may be comprised of more than one individual network, and networks of more than one type. For example, multiple LANs and/or wireless networks may be connected as part of the Internet.

Much of the electronic data stored on computers is confidential or private and various methods are known for safeguarding electronic data sent by a computer over a public network. For example, Hypertext Transfer Protocol Secure (HTTPS) is a combination of the Hypertext Transfer Protocol and a cryptographic protocol used for creating a secure channel over an otherwise insecure network in order to protect the contents of such communications from eavesdroppers. Transport Layer Security (TLS) and its predecessor, Secure Sockets Layer (SSL), are cryptographic protocols that provide security and data integrity for communications over networks such as the Internet. TLS and SSL encrypt the segments of network connections at the Transport Layer end-to-end.

BRIEF SUMMARY

One example embodiment of the present invention provides a method, comprising transmitting primary data over a computer network from a source host to a receiving host, the source host intentionally-corrupting packets within the primary data transmission to establish a hidden message, and the receiving host interpreting the intentionally-corrupted packets to determine the hidden message.

DETAILED DESCRIPTION

Embodiments of the invention provide methods of transmitting a hidden electronic message over a public network with even greater security than provided by conventional methods of securing an electronic transmission. Transmission of the message may be made "stealth" by hiding the message within a primary data transmission. In particular, the message may be hidden in any of a variety of ways disclosed herein, in the form of corrupted packets of the primary data transmission. Thus, a party monitoring the network is unaware that the hidden message is even being transmitted. Even a party having tools for attempting to break the encryption or other techniques used to safeguard the primary data transmission will disregard the corrupted message packets as a seemingly routine aspect of transmitting data over a network.

Figure 1:
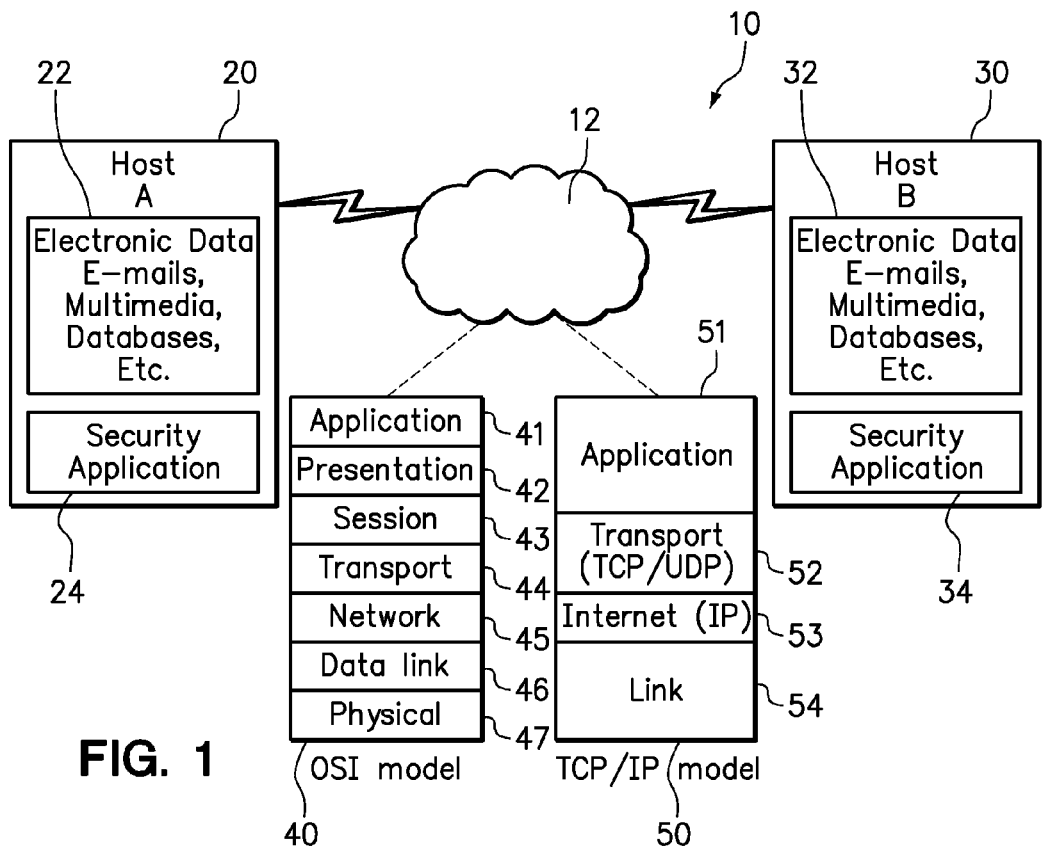
FIG. 1 is a schematic diagram of a system enabling secured communication between a source host and a receiving host over a multi-layered network.

FIG. 1 is a schematic diagram representing a system 10 enabling secured communication between a source host 20 ("Host A") and a receiving host 30 ("Host B") over a multi-layered network 12 according to an embodiment of the invention. In the field of computer networking, a host is a computer connected to a network at a unique Internet Protocol (IP) address. The source host 20 provides a source of electronic data 22 that may be selectively transmitted over the network 12 to the receiving host 30. The electronic data 22 to be transmitted may include any electronically storable files, such as e-mails prepared using an e-mail client, multimedia content such as images, music, and video, databases, and so forth. The receiving host 30 also includes storage for receiving and storing the electronic data 22 as transmitted by the source host 20. It should be noted that Host A and Host B may sometimes alternate roles, with Host B instead performing the role of a source host and Host A instead performing the role of a receiving host, for transmitting a hidden message along with the electronic data 32 from Host B to Host A.

The source host 20 also includes a security application component 24. The receiving host 30 also further includes a security application component 34, which may be part of a security software suite that also includes the security application component 24 on the source host 20. Together, the security application components 24, 34 include computer usable program code for enabling secure transmission of the electronic data 22 from the source host 20 to the receiving host 30 along with hidden messages, according to the various methods described herein. The computer usable program code may be stored on a computer usable storage medium, such as, for example, a hard disk, flash memory, or an optical storage medium.

The described methods may be implemented on any of a variety of multi-layered networks. In a multi-layered network, a protocol includes a set of rules used by computers to communicate across the network. A protocol suite includes the definition of the protocols. A protocol stack includes a particular software implementation of a protocol suite. Modules of a protocol are commonly referred to as layers in a stack of protocols. A layer includes a collection of conceptually similar functions providing services to the layer above and receives service from the layer below.

Two example models of multi-layered networks are diagrammed for reference in FIG. 1. The multi-layered network 12 may follow the Open System Interconnection Reference Model (OSI Model) 40, as a general example, or the Internet Protocol Suite (also known as "TCP/IP") model 50, as a more specific example. The OSI Model 40 is a prescriptive model having seven layers: an Application Layer 41, a Presentation Layer 42, a Session Layer 43, a Transport Layer 44, a Network Layer 45, a Data-Link Layer 46, and a Physical Layer 47. The Internet Protocol Suite (also known as the TCP/IP Model) is a descriptive framework enabling computers to communicate over a network. The Internet Protocol Suite is often described as having four layers: an Application Layer 51, a Transport Layer 52, an Internet Layer 53, and a Link Layer 54.

Referring to the TCP/IP model 50, the Application Layer 51 contains all protocols and methods that fall into the realm of process-to-process communications via an Internet Protocol (IP) network using the Transport Layer (52) protocols to establish underlying host-to-host connections. The duties of the Transport Layer 52 include tasks such as forming data packets and adding source and destination port numbers in the header of each Transport Layer (52) data packet. Together with the source and destination IP address, the port numbers constitute a network socket, i.e. an identification address of the process-to-process communication. The Internet Layer 53 is the group of methods, protocols, and specifications which are used to transport packets from the source host 20 across network boundaries, if necessary, to the receiving host 30 specified by a network address (IP address) which is defined for this purpose by the Internet Protocol (IP). The Link Layer 54 is the lowest layer of the TCP/IP Model 50, and includes the group of protocols that only operate on the link of each particular host 20, 30. The link includes the physical and logical network components used to interconnect the hosts 20, 30 in the network 12. In a LAN or WAN, a link protocol is a suite of methods and standards that operate only between adjacent network nodes of the LAN or WAN.

Figure 2:
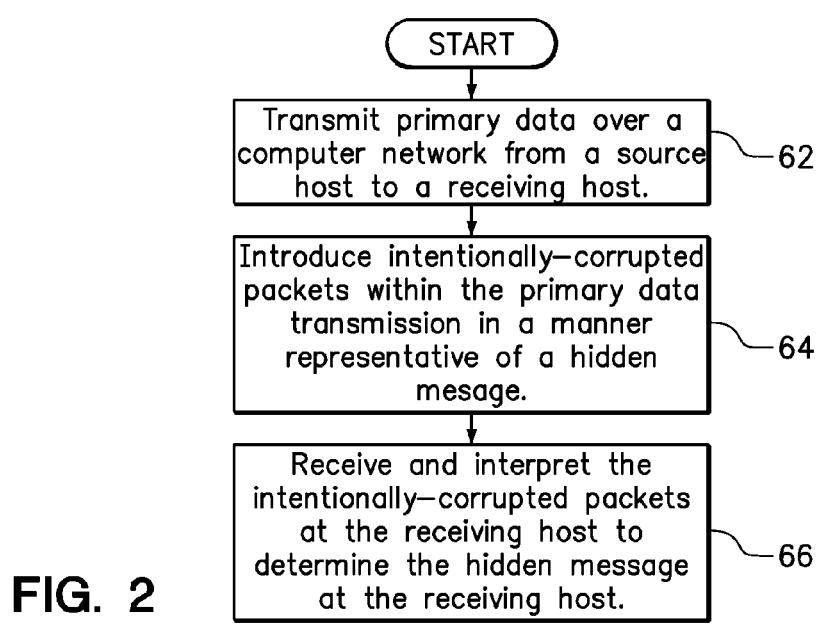
FIG. 2 is a flowchart broadly outlining a method of securely communicating over a network between a source host and a receiving host.

FIG. 2 is a flowchart broadly outlining a method of securely communicating over a network between a source host and a receiving host according to one or more embodiments of the invention. Step 62 involves transmitting primary data over a computer network from a source host to a receiving host. Step 64 involves introducing detectable errors, such as in the form of intentionally-corrupted packets of the primary data transmission in a manner providing a hidden message. The subject matter of the hidden message may be unrelated to the subject matter of the primary data transmission. The receiving host may interpret the hidden message from the intentionally-corrupted data packets in step 66. The detectable errors are intentionally introduced into a sufficiently high level of the network protocol to be detected by the receiving host, so that the receiving host will request a retransmission of the portion of the primary data that contained the intentionally-corrupted packets. In particular, the receipt of a corrupted packet (whether intentional or not) may result in the packet being reported as not received, and the packet will be queued for subsequent retransmission. A subsequent transmission of this packet might also contain an error, either unintentional or intentional (e.g. due to a different portion of the hidden message), in which case the packet may again be reported as not received and re-queued for transmission. Concurrently, the hidden message provided by the intentionally-corrupted packets is detected and extracted. As a result, the receiving host receives the complete primary data, in addition to having received the hidden message. The various ways in which the message may be conveyed and subsequently determined using intentionally-created detectable errors are the subject of additional embodiments described below.

The frequency of the detectable errors may be kept sufficiently low that suspicions are unlikely to be aroused by anyone monitoring the flow of network traffic. Increasing the size of the primary data transmission generally increases the number of packets in which the primary message is transmitted over the network. Therefore, the hidden message may be transmitted less conspicuously by embedding the hidden message within relatively larger primary data transmissions.

Figure 3:
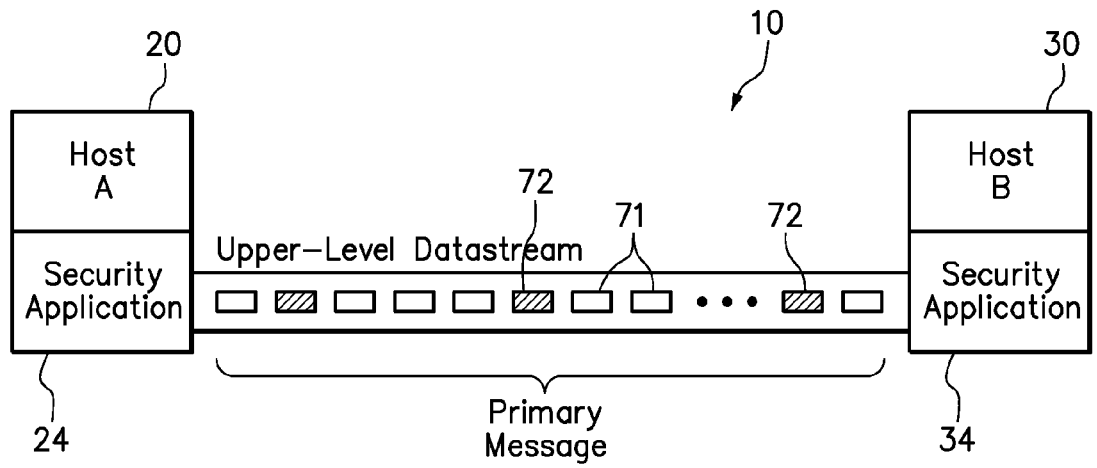
FIG. 3 is a schematic diagram of a system as configured for communicating a hidden message in a pattern of intentionally-corrupted packets and uncorrupted packets.

FIG. 3 is a schematic diagram of the system 10 as configured for communicating a hidden message from the source host 20 to the receiving host 30 in a pattern of intentionally-corrupted packets 72 (which form at least a subset of "bad" packets) and uncorrupted (i.e. "good") packets 71. The packets 71, 72 contain header information (not shown) for properly routing the packets 71, 72 to the receiving host 30. It should be noted that the "bad" packets may further include unintentionally-corrupted packets, which may regularly occur in the conventional transmission of electronic data over a network. For simplicity, unintentionally-corrupted packets are omitted in FIG. 3, but may be accounted for using error detection, as further described below.

The corrupted packets 72 may be used to provide a hidden message in a variety of ways. One way to provide the hidden message is to generate a binary pattern. For example, the pattern of the corrupted packets 72 and the uncorrupted packets 71 may spell out a binary pattern (e.g. 0s and 1s) conveying the hidden message. One sub-pattern of packets may be selected to represent a '1' bit, while another sub-pattern of packets may be selected to represent a '0' bit. In one relatively simple example, the transmission of a first number (e.g. 113) of consecutive good packets 71 followed by an intentionally-corrupted packet 72 corresponds to a '0', while the transmission of a second number (e.g. 112) of consecutive good packets 71 followed by a corrupted packet 72 corresponds to a '1'. The pattern for encoding the hidden message is known to both the security application component 32 residing on the source host 20 and the security application component 34 residing on the receiving host 30, so that the security application component 34 on the receiving host 30 can identify and interpret the pattern of intentionally-corrupted packets 72.

Figure 4:
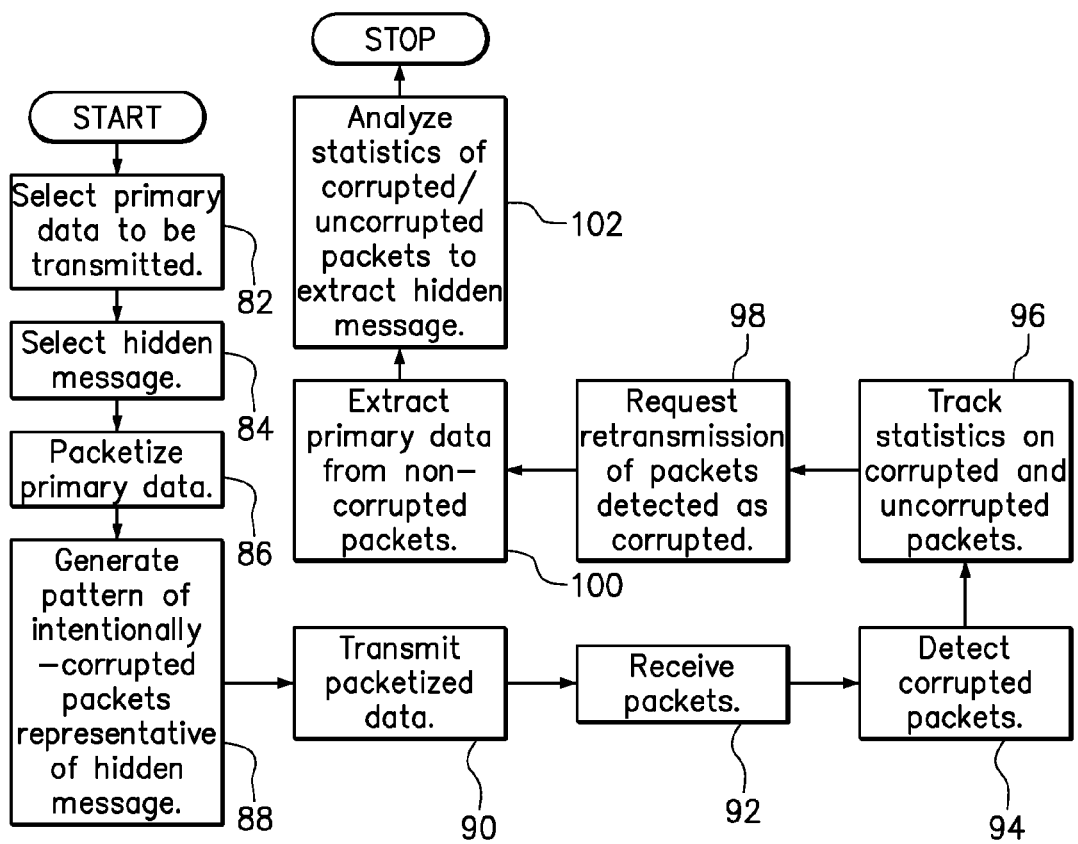
FIG. 4 is a flowchart outlining a method of securely communicating over a network between a source host and a receiving host.

FIG. 4 is a flowchart outlining a method of securely communicating over a network between a source host and a receiving host. The method may be applied, for example, to the system 10 as embodied in FIG. 3. In step 82, primary data is selected for transmission. For example, the primary data may include one or more multimedia files, either to be transmitted using a transmission protocol, such as an e-mail protocol, or a Hypertext Transfer Protocol. A hidden message to be transmitted is selected in step 84. The primary data is packetized for transmission in step 86. Intentionally-corrupted packets are generated in step 88. Step 88 may be performed as part of the step of packetizing the primary data for transmission (step 86), in that selected packets of the primary data may be intentionally-corrupted as part of forming the packets of the primary data. The intentionally-corrupted packets may be created, for example, by appending a data portion of selected primary data packets with an incorrect checksum. Step 88 further includes generating a pattern of the intentionally-corrupted packets providing the hidden message selected in step 84. The packetized data, including the intentionally-corrupted packets, is transmitted in step 90. During transmission of the primary data, the intentionally-corrupted packets are interspersed with the primary data transmission in step 92 according to the pattern generated in step 88.

The transmitted packets, including the good packets and the intentionally-corrupted packets are received in step 92 by a receiving host. As the packets are received, any corrupted (bad) packets are detected according to step 94. Corrupted packets may be identified, for example, as packets having checksums that disagree with the data area. The detected corrupted packets may be intentionally-corrupted packets sent in the pattern generated to encode the hidden message. Statistics may be tracked on both corrupted and uncorrupted packets in step 96. In step 98, the receiving host requests a retransmission of primary data packets that were detected as being corrupted. Both intentionally-corrupted and unintentionally-corrupted packets may be retransmitted.

In step 100, the primary data is extracted from the good packets. The good packets include packets that were uncorrupted as originally sent, as well as packets retransmitted in response to step 98 after previously being detected as corrupted in step 94. Good packets may be identified, for example, as packets having correct checksums appended. The data area of the identified good packets may be read, and that data may be extracted from the good packets as part of receiving and interpreting the primary data transmission.

To interpret the hidden message, the statistics generated in step 96 may be analyzed in step 102. Any pattern in these corrupted packets may be detected, for example, and interpreted to determine the hidden message. For example, the receiving host may look for recognizable sub-patterns stored in memory, and cross-reference the recognized sub-pattern with a lookup table identifying the "value" of each sub-pattern. Using the example of binary coding above, the receiving host may recognize a particular number of consecutive good packets followed by a corrupted packet as a "1" and another number of consecutive good packets followed by a corrupted packet as a "0." However, the corrupted packets may also include packets that were inadvertently corrupted. Corrupted packets that do not appear to form part of a recognizable pattern may be excluded as unintentionally corrupted packets. Steps 100 and 102 may be performed in parallel. That is, the primary data may be interpreted from the good packets according to step 100 while the hidden message is interpreted from the pattern of intentionally-corrupted packets in step 102.

The nature of the corruption of the corrupted packets may also be used to convey a portion or an aspect of the hidden message. For instance, the check value of an intentionally-corrupted packet may be manipulated in a specific manner so that the discrepancy between an expected check character value and an actual check character value has some predetermined significance. For example, the check value may be deliberately altered in a predetermined manner so that the receiving host may readily identify that this particular corrupted packet was intentionally-corrupted, to distinguish the particular packet from an unintentionally-corrupted packet. Alternatively, the check values could be deliberately altered in a way that conveys the hidden message. For example, the check values could be altered in a manner that conveys a binary pattern. In one specific example, the check value may be altered in one specific, identifiable, predetermined manner to indicate a "1" or in another specific, identifiable, predetermined manner to indicate a "0" to generate a binary pattern. This method of generating a binary pattern is an alternative to the above-described method of generating a binary pattern wherein a predetermined number of consecutive good packets followed by a bad packet is used to indicate a "1" or "0."

Figure 5:
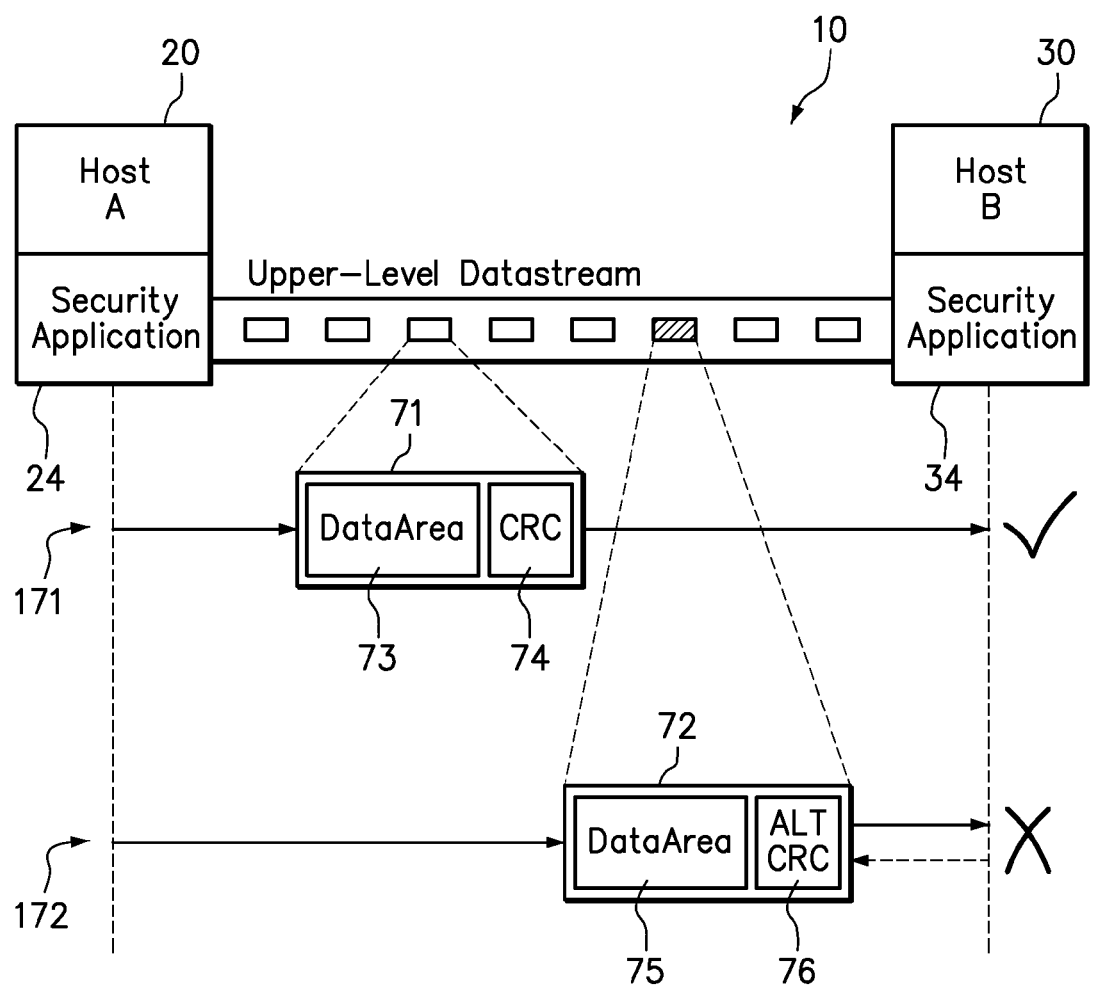
FIG. 5 is a schematic diagram of a system as alternatively configured for communicating a hidden message by embedding the hidden message in one or more of the intentionally-corrupted packets.

FIG. 5 is a schematic diagram of the system 10 as alternatively embedding the hidden message in the data area of the intentionally-corrupted packets 72. The transmission of one good packet 71 and the transmission of one intentionally-corrupted packet 72 are diagrammed at 171 and 172, respectively. The source host 20 generates the good packet 71 by embedding a portion of the primary data within the limited bit space of the data area 73 and appending the data area 73 with a good checksum ("CRC") 74. The source host 20 generates the intentionally-corrupted packet 72 by embedding a portion of the hidden message in a data area 75 and appending the data area 75 with an altered checksum ("ALT CRC") 76.

A deterministic algorithm is used to generate the CRC 74 and the ALT CRC 76. The deterministic algorithm predictably produces the same output for a given input. The CRC 74 is set to the value of the deterministic algorithm as applied to the data area 73 of the good packet 71. The receiving host 30 applies the deterministic algorithm to the data area 73 to compute a checksum and compares it to the CRC 74 to confirm that the good packet 71 arrived intact. The ALT-CRC 76 is intentionally set to a value different than the value of the deterministic algorithm applied to the data area 75 of the intentionally-corrupted packet 72.

The intentionally-corrupted packet may be distinguished from other, unintentionally-corrupted packets that regularly occur during the transmission of data over a network by altering a check value in a specific manner. For example, the source host 20 might generate the ALT-CRC by substituting an alternate value of the checksum, such as the exclusive-OR of the computed value. On the other end, the receiving host 30 will compute the check-value and determine that the transmitted check-value (ALT-CRC) does not match the computed check-value. In this case, the miscompare will trigger an exclusive-OR comparison of these two values to recover the portion of the hidden message embedded in the data area 75.

Another way to generate an intentionally-corrupted packet is to randomly change the value of any bit in the data packet. Recognizing that a good packet requires the data area and the CRC to agree, intentionally changing a bit in the data area would cause the data are and the appended CRC to disagree, thereby creating an intentionally-corrupted packet. Thus, an alternative way to generate a primary data stream containing the hidden message would be to initially generate all the packets to be transmitted with a data area and a correct CRC appended, and to subsequently alter any bit in the packet, i.e., either a bit in the data area or a bit in the CRC, such that the data area and appended CRC disagree.

It is possible for the hidden message, itself, to be unintentionally-corrupted. Additional steps may be used to detect and possibly correct such errors. Steps for retransmitting all or portions of the hidden second message may also be needed. One solution is sending the hidden message multiple times so that the hidden message can be verified. The receiving host may confirm that the intended hidden message has been successfully received by determining that the same message has been sent more than once. Another solution involves a "reverse transmission," using methods described above, to covertly request retransmission or all or part of a hidden message. Yet another solution is that the receiving system can simply request a retransmission of the entire, original primary data transmission.

The above embodiments are described, by way of example, in the context of either an OSI model or a TCP/IP model. It should be recognized, however, that embodiments may be adapted for use with other protocols. Examples of other protocols suitable for use with one or more embodiments of the invention include User Datagram Protocol (UDP), Network Basic Input/Output System (NETBIOS), Internetwork Packet Exchange (IPX), and even custom protocols. The 7-layer protocol of the OSI model, for example, is not adopted within point-to-point via radio links. Additionally, although the hidden message is transmitted in a stealth manner in the above-described embodiments, additional precautions may be taken, such as by encoding the hidden message.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible storage medium having computer-usable program code stored on the storage medium.

Any combination of one or more computer usable or computer readable storage medium(s) may be utilized. The computer-usable or computer-readable storage medium may be, for example but not limited to, an electronic, magnetic, electromagnetic, or semiconductor apparatus or device. More specific examples (a non-exhaustive list) of the computer-readable medium include: a portable computer diskette, a hard disk, random access memory (RAM), read-only memory (ROM), an erasable programmable read-only memory (EPROM or Flash memory), a portable compact disc read-only memory (CD-ROM), an optical storage device, or a magnetic storage device. The computer-usable or computer-readable storage medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable storage medium may be any storage medium that can contain or store the program for use by a computer. Computer usable program code contained on the computer-usable storage medium may be communicated by a propagated data signal, either in baseband or as part of a carrier wave. The computer usable program code may be transmitted from one storage medium to another storage medium using any appropriate transmission medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:

transmitting primary data over a computer network from a source host to a receiving host, the source host intentionally-corrupting selected packets within the primary data transmission to provide a hidden message within the primary data as a binary pattern of the intentionally-corrupted packets, using a first predetermined sub-pattern of intentionally-corrupted and uncorrupted packets to represent a 1 bit and a second predetermined sub-pattern of intentionally-corrupted and uncorrupted packets to represent a 0 bit; and the receiving host interpreting the intentionally-corrupted packets to determine the hidden message.

2. A method, comprising:

transmitting primary data over a computer network from a source host to a receiving host, the source host intentionally-corrupting selected packets within the primary data transmission to provide a hidden message within the primary data;

applying a deterministic algorithm to all packets of the primary data transmission to generate correct checksums and appending the uncorrupted packets with the correct checksums at the source host;

embedding the hidden message within a data area of the packets selected to be intentionally corrupted;

altering a bit of the packets selected to be intentionally-corrupted at the source host such that the checksum and data area disagree; and the receiving host interpreting the intentionally-corrupted packets to determine the hidden message, including applying the deterministic algorithm to the checksums at the receiving host to identify the uncorrupted packets and the intentionally-corrupted packets and extracting the hidden message embedded within the data area of the intentionally-corrupted packets.

3. The method of claim 2, wherein the intentionally incorrect checksum of a particular intentionally-corrupted packet is set as the exclusive OR of the value of the deterministic algorithm as applied to the particular intentionally-corrupted packet.

4. The method of claim 1, further comprising:

retransmitting, without any intentionally-corrupted packets, a portion of the primary data transmission originally containing the intentionally-corrupted packets.

5. The method of claim 1, wherein the step of the source host intentionally-corrupting selected packets within the primary data transmission comprises:

generating a data area;

appending the data area with a check value computed from the data area; and intentionally altering a bit of the data area or the check value such that the data area and the check value disagree.

6. A method, comprising:

transmitting primary data over a computer network from a source host to a receiving host, the source host intentionally-corrupting selected packets within the primary data transmission to provide a hidden message within the primary data, the receiving host interpreting the intentionally-corrupted packets to determine the hidden message;

performing error detection on the transmission of the intentionally-corrupted packets to differentiate between the intentionally-corrupted packets and other, unintentionally created transmission errors; and transmitting intentionally-corrupted packets from the receiving host back to the source host in a manner representing a request to retransmit the hidden message from the source host to the receiving host.

7. The method of claim 6, wherein the step of performing error detection further comprises:

transmitting, in response to detecting an error in the transmission of the hidden message, a duplicate of the hidden message from the source host to the receiving host.

8. The method of claim 7, further comprising:

verifying at the receiving host that the duplicate transmission of the hidden message matches the original transmission of the hidden message.

9. The method of claim 8, further comprising:

transmitting the primary transmission at a sufficiently high level of the network to trigger automatically retransmitting the portion of the primary data transmission originally containing the intentionally-corrupted packets from the source host to the receiver host.

10. A computer program product including computer usable program code embodied on a non-transitory computer usable storage medium, the computer program product including:

computer usable program code for transmitting primary data over a computer network from a source host to a receiving host;

computer usable program code for the source host intentionally-corrupting selected packets within the primary data transmission to establish a hidden message as a binary pattern of the intentionally-corrupted packets, using a first predetermined sub-pattern of intentionally-corrupted and uncorrupted packets to represent a 1 bit and a second predetermined sub-pattern of intentionally-corrupted and uncorrupted packets to represent a 0 bit; and computer usable program code for the receiving host interpreting the intentionally-corrupted packets to determine the hidden message.

11. The computer program product of claim 10, further comprising:

computer usable program code for performing error detection on the transmission of the intentionally-corrupted packets to differentiate between the intentionally-corrupted packets and other, unintentionally created transmission errors.

12. The computer program product of claim 11, wherein the computer usable program code for performing error detection further comprises:

computer usable program code for transmitting, in response to detecting an error in the transmission of the hidden message, a duplicate of the hidden message from the source host to the receiving host.

13. The computer program product of claim 11, further comprising:

computer usable program code for verifying at the receiving host that the duplicate transmission of the hidden message matches the original transmission of the hidden message.

14. The computer program product of claim 11, further comprising:
  computer usable program code for generating a data area;
  computer usable program code for appending the data area with a check value computed from the data area; and
  computer usable program code for intentionally altering a bit of the data area or the check value such that the data area and the check value disagree.

* * * * *